United States Patent [19]

Dyment et al.

[11] Patent Number: 5,443,168
[45] Date of Patent: Aug. 22, 1995

[54] PORTABLE DISPLAY STAND WITH SHELVES

[75] Inventors: James A. Dyment; Michael S. Kerth, both of Cincinnati, Ohio

[73] Assignee: Dyment Limited, Toronto, Canada

[21] Appl. No.: 177,414

[22] Filed: Jan. 5, 1994

[51] Int. Cl.⁶ ............................................. A47F 5/00
[52] U.S. Cl. .................................. 211/149; 211/186; 248/174; 280/47.19
[58] Field of Search ............... 211/132, 149, 135, 186; 248/174; 280/79.3, 47.17, 47.19, 47.24

[56] References Cited

U.S. PATENT DOCUMENTS

| | | |
|---|---|---|
| Re. 32,668 | 5/1988 | Smith . |
| 901,858 | 10/1908 | Williams . |
| 957,218 | 5/1910 | Klefeker . |
| 1,921,251 | 8/1933 | Gerould ........................ 280/47.19 |
| 2,088,741 | 8/1937 | Hanson . |
| 2,249,234 | 7/1941 | Srodulski . |
| 2,642,330 | 6/1953 | Armour . |
| 2,797,815 | 7/1957 | Gorman . |
| 2,842,373 | 7/1958 | Duerr . |
| 2,868,557 | 1/1959 | Klipp et al. . |
| 2,905,480 | 9/1959 | Giovannelli ................. 280/47.19 X |
| 2,990,764 | 7/1961 | Wilder . |
| 3,045,835 | 7/1962 | Hawthorne et al. . |
| 3,087,740 | 4/1963 | Mitty et al. . |
| 3,093,247 | 6/1963 | Erickson . |
| 3,113,702 | 12/1963 | Luedtke . |
| 3,876,223 | 4/1975 | O'Reilly et al. .................. 280/47.19 |
| 4,122,782 | 10/1978 | Coombs . |
| 4,151,803 | 5/1979 | Ferrera et al. . |
| 4,202,278 | 5/1980 | Wadenhed . |
| 4,311,100 | 1/1982 | Gardner et al. . |
| 4,441,734 | 4/1984 | Schlissel . |
| 4,493,424 | 1/1985 | Smith . |
| 4,614,350 | 9/1986 | Bunch ............................ 280/47.24 |
| 4,646,922 | 3/1987 | Smith . |
| 4,723,664 | 2/1988 | Smith . |
| 4,726,476 | 2/1988 | Smith . |
| 4,740,010 | 4/1988 | Moskovitz . |
| 4,744,474 | 5/1988 | Tallving . |
| 4,760,928 | 8/1988 | Bustos . |
| 4,801,024 | 1/1989 | Flum et al. . |
| 4,949,851 | 8/1990 | Shaffer . |
| 4,953,744 | 9/1990 | Koyama ..................... 280/47.17 X |
| 5,213,220 | 5/1993 | McBride ........................... 211/132 |
| 5,213,351 | 5/1993 | Chen ............................... 280/47.19 |

*Primary Examiner*—Robert W. Gibson, Jr.
*Attorney, Agent, or Firm*—Holland & Knight

[57] ABSTRACT

A portable display which comprises a front panel, a back panel, opposed side panels extending between the front and back panels, a bottom panel assembly consisting of four bottom flaps each connected to one of the front, back and opposed side panels, and, top, bottom and intermediate shelves vertically spaced along the back and side panels. The bottom flaps of the base assembly are foldable into a closed position to form a seat which mounts a wheel assembly including a mounting block or axle carrying wheels at either end. The back panel is provided with a handle for moving the display from one location to another, and such handle is formed with slots to receive a header containing advertising for the products being sold.

15 Claims, 5 Drawing Sheets

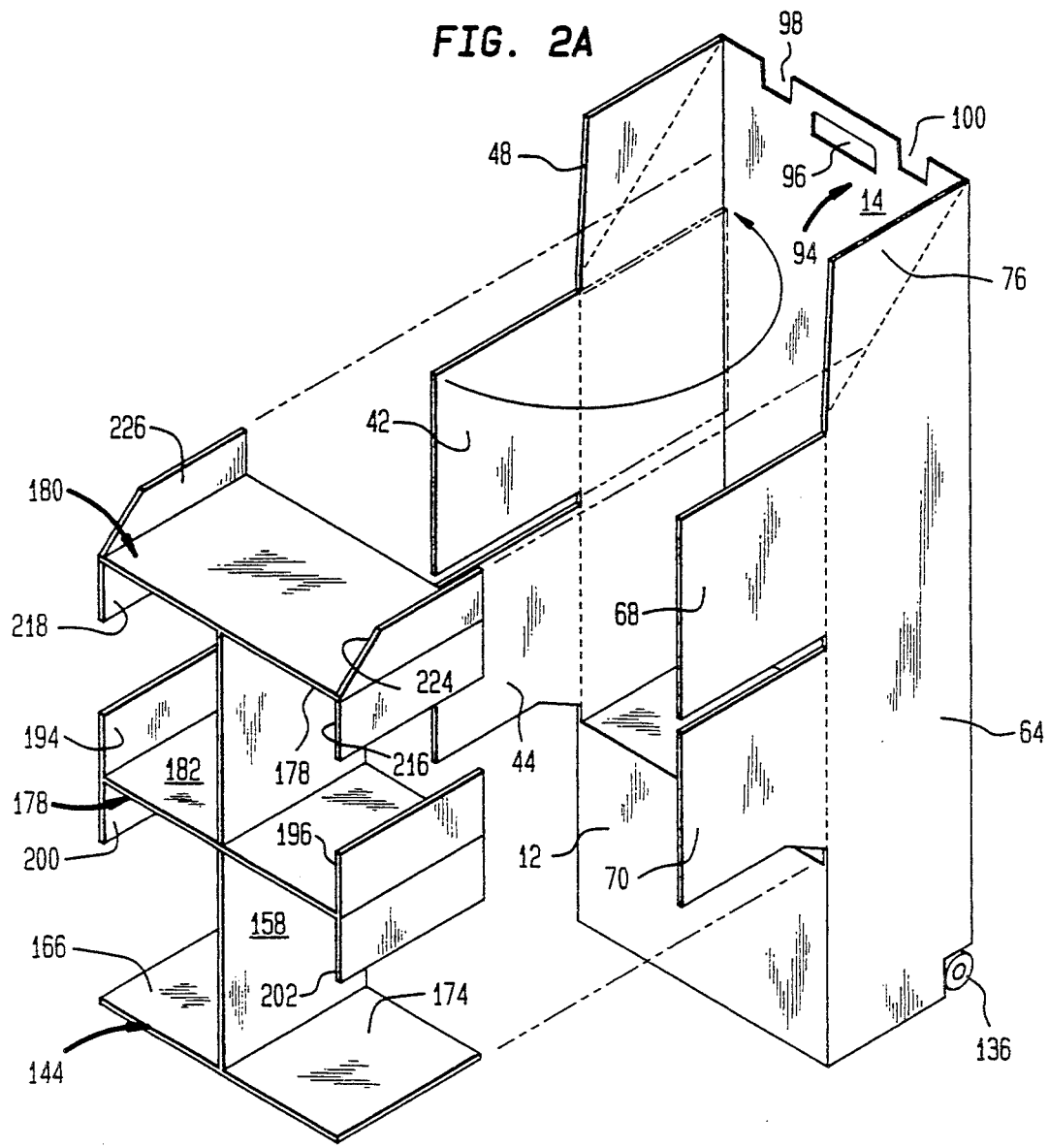

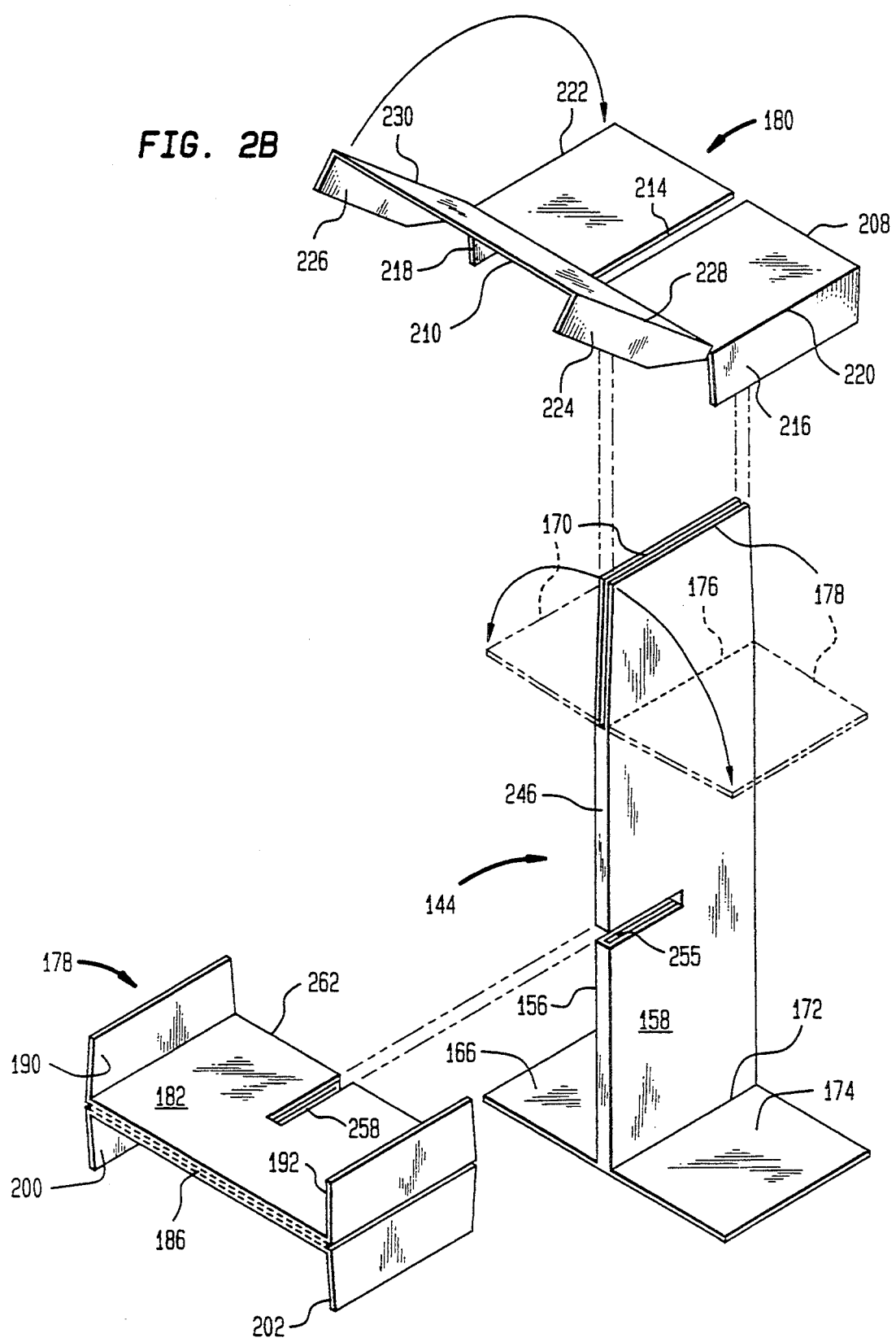

PORTABLE DISPLAY STAND WITH SHELVES

RELATED APPLICATIONS

This application is related to U.S. patent application Ser. No. 08/023,411 to Dyment et al., owned by the assignee of this invention, filed Feb. 26, 1993, and entitled "Promotional Portable Display Stand," the disclosure of which is incorporated by reference in its entirety herein.

FIELD OF THE INVENTION

This invention relates to display stands, and, more particularly, to a portable display unit having shelves capable of holding a wide variety of items which is transportable to a desired location within a store to create a free-standing display for stimulating impulse buying.

BACKGROUND OF THE INVENTION

Promotional display stands have been used in supermarkets, convenience stores and other retail outlets for a number of years to stimulate impulse buying of a wide variety of products. Display stands are often preferable to stacking articles in boxes in an aisle or other location, and/or placing such products in their normal location on the shelves of a retail establishment. Many display stands feature signs or other advertisements for the product being sold, and often include aesthetically pleasing artwork to attract the customer's attention to the product displayed.

Although often advantageous in stimulating sales of different items, many display stands have one or more drawbacks which limit their effectiveness or practicality. For example, a number of display stands are shipped to the supermarket, convenience store or other retail establishment in a collapsed condition for ease of transport and storing. Such display stands can be difficult and time consuming to erect which takes time away from the normal activities of stocking personnel in such retail establishments. Even if the display stand is designed to self-erect, it must nevertheless be retrieved from storage, and thereafter stocked with product, before the display is ready for use. This is a time consuming and labor intensive operation. See, for example, U.S. Pat. Nos. RE. 32,668; 4,949,851; 4,801,024; 4,760,928; 4,726,476; 4,723,664; 4,646,922; 4,493,424; 4,311,100; 4,151,803; and 2,797,815.

Another problem with certain types of display stands is their lack of mobility. In many instances, the display stand must be located in the desired position within the retail establishment, stocked with items to be sold and then left there until all the items displayed are purchased or the stock is removed by employees of the establishment. The store owner is not permitted to change the location of the display stand once it is stocked in order to determine where the particular product displayed might sell best, unless an employee unstocks the display, moves it to another location and then places the stock back onto the display. This lack of flexibility detracts from the usefulness and effectiveness of many display stands in selling the most product possible. Examples of display stands which are not mobile are found, for example, in U.S. Pat. Nos. RE. 32,668; 4,949,851; 4,801,024; 4,760,928; 4,726,476; 4,723,664; 4,646,922; 4,493,424; 4,311,100; 4,151,803; and 2,797,815.

This problem of lack of mobility has been addressed in the past, but many display stands designed for portability present other problems which detract from their usefulness. For example, many display stands having wheels, casters or the like to permit movement thereof suffer from a lack of aesthetic appeal, i.e. the wheel assemblies are clearly visible which detracts from their appearance and/or interferes with the articles of merchandise on display. See for example U.S. Pat. Nos. 4,744,474; 4,740,010; 4,441,734; 3,087,740; 2,990,764; 2,868,557; and 2,842,373.

SUMMARY OF THE INVENTION

It is therefore among the objectives of this invention to provide a portable display stand which is aesthetically pleasing in appearance, which is readily movable to any location in a retail establishment, which is capable of supporting individual items or boxed items and which does not interfere with access to the articles on display.

These objectives are accomplished in a portable display which comprises a front panel, a back panel, opposed side panels extending between the front and back panels, a bottom panel assembly consisting of four bottom flaps each connected to one of the front, back and opposed side panels, and, top, bottom and intermediate shelves vertically spaced along the back and side panels. The bottom flaps of the base assembly are foldable into a closed position to form a seat which mounts a wheel assembly including a mounting block or axle carrying wheels at either end. The back panel is provided with a handle for moving the display from one location to another, and such handle is formed with slots to receive a header containing advertising for the products being sold.

One aspect of this invention is predicated upon the concept of providing a portable display having a wheel assembly which is substantially concealed from view, at least when viewing the display from the front, and does not interfere with access to the products carried by the display. In the presently preferred embodiment, the bottom flap associated with the back panel includes a first fold line which interconnects it to the back panel, a second fold line spaced from the first fold line, and, a third fold line spaced from the second fold line. The portion of the back bottom flap between the first and second fold lines forms an essentially horizontal section extending from the back panel of the display in a direction towards its front panel. The portion of the back bottom flap between the second and third fold lines forms a vertical section which extends downwardly from the second fold line, generally perpendicular to the horizontal section. The horizontal and vertical sections form an inverted L-shaped seat within which the wheel assembly is mounted.

In the presently preferred embodiment, the wheel assembly is formed of a rectangular shaped block or axle of injection molded plastic. A shaft or post is integrally formed at opposite ends of the axle, each of which receive a wheel mounted thereto. The overall length of the axle and wheels is such that the entire wheel assembly is substantially concealed within the seat formed at the base of the display stand. That is, the wheels are positioned inwardly from the side panels such that no part of the wheel assembly is visible from the front of the display, and only a portion of the wheels can be viewed from either side of the display. This allows the display of this invention to be readily moved from place to place around a retail establishment, without requiring the products it carries to be first removed and then restocked on the display, and without detracting from the overall aesthetic appearance of the display.

Another aspect of this invention involves the provision of at least three shelves, at least two of which are preferably divided into two halves or compartments by a vertically extending divider. In the presently preferred embodiment, the divider comprises two half sections connected along a central fold line with a shelf mounting slot extending therebetween which is perpendicular to and intersects the central fold line. Each of the divider halves is connected by a first fold line extending along its bottom edge to a bottom shelf flap, and by a second fold line extending along its top edge to a top flap. The divider is positioned midway between the side panels of the display such that the bottom edge of each of its half sections rests against a base rollup support carried atop the bottom panel of the display, and the half sections extend vertically upwardly from the base rollup support generally parallel to the side panels of the display. The bottom shelf flaps are folded at right angles relative to the vertically extending portion of the divider thus forming the bottom shelf of the display.

The top shelf and intermediate shelf are each supported between the side panels in part by the divider, and in part by shelf flaps associated with each of the side panels. Preferably, each side panel includes a locking flap at the top, an upper side shelf flap spaced vertically below the locking flap, and, a lower side shelf flap spaced vertically below the upper side shelf flap. The two spaces or slots between the three above-described flaps associated with each side panel forms a seat which mounts the side edges of the top and intermediate shelves. Additionally, the center portion of the intermediate shelf is supported within the shelf mounting slot formed in the divider, and a slot formed on the lower surface of the top shelf receives the top flaps of the divider to form a connection therebetween. This construction provides a secure connection for both the top and intermediate shelves of the display herein.

In order to even further stabilize the top and intermediate shelves, each of such shelves may include a pair of glue flaps at either end connected by fold lines to the main portion of the shelves. The glue flaps located on either end of the top shelf are adhesively connected to the locking flap and upper side shelf of each side panel, while the glue flaps associated with the intermediate shelf are adhesively connected to the upper and lower side flaps of both side panels. This further enhances the overall stability of the portable display of this invention allowing it to carry relatively heavy items to be sold, and, if desired, enabling it to be reused by the retail establishment while maintaining its aesthetic appeal.

DESCRIPTION OF THE DRAWINGS

The structure, operation and advantages of the presently preferred embodiment of this invention will become further apparent upon consideration of the following description, taken into conjunction with the accompanying drawings, wherein:

FIG. 2A is a partially disassembled, exploded perspective view of the display stand shown in FIG. 1;

FIG. 2B is a disassembled perspective view of the various elements forming the shelf assembly herein;

DETAILED DESCRIPTION OF THE INVENTION

Figure 1:
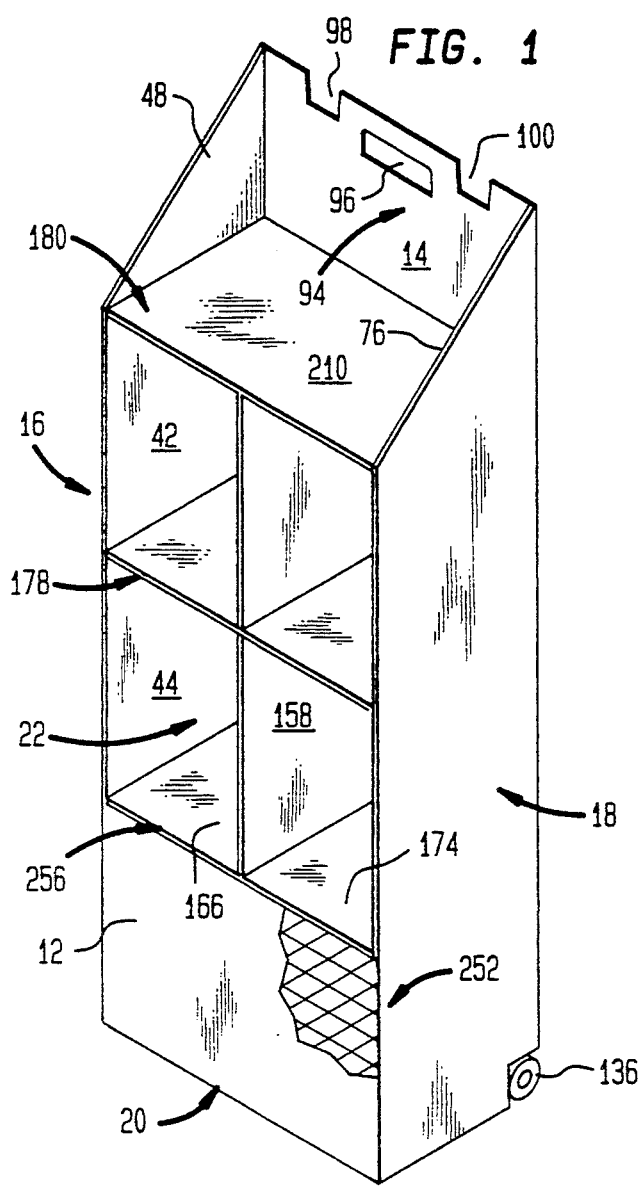
FIG. 1 is a perspective view of the assembled portable display of this invention.

Referring now to the Figs., the portable display 10 of this invention includes a front panel 12, a back panel 14, a left side panel 16, a right side panel 18, a bottom panel assembly 20 and a shelf-assembly 22. For purposes of the present discussion, the term "left" refers to the left-hand side of the display 10 looking in a direction toward the front panel 12, whereas "right" refers to the opposite of display 10. The terms "top," "upper" and "upwardly" refer to a direction from the bottom panel assembly 20 vertically upwardly as depicted in the Figs., whereas the terms "bottom," "lower" and "downwardly" refer to the opposite direction. Each of the individual panels 12-20 and the shelf assembly 22 are described separately below, and then the overall display 10 is described in connection with an assembly operation.

Figure 4:
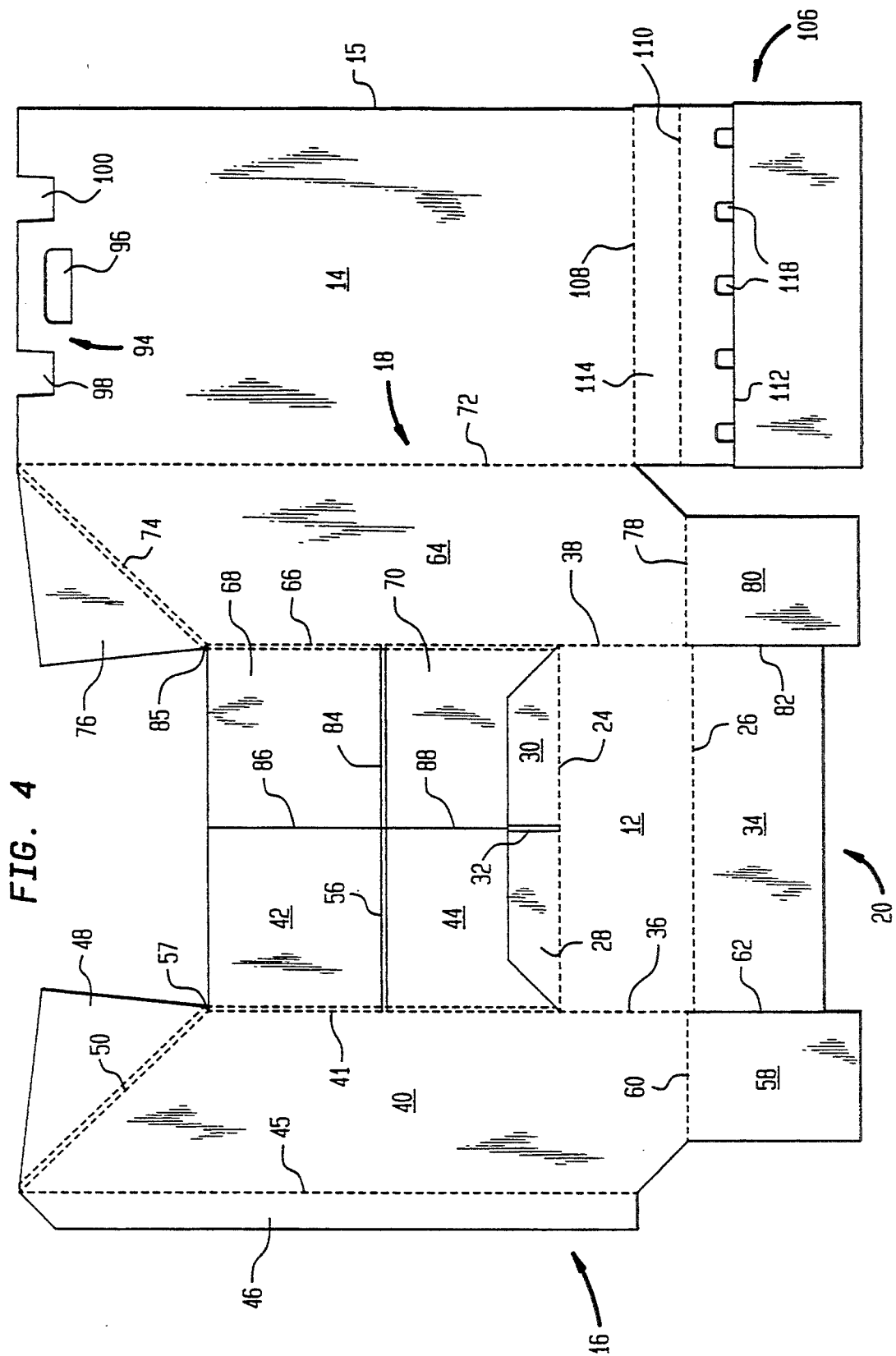
FIG. 4 is a view of the cardboard blank from which a portion of the display stand is folded.

In the presently preferred embodiment, and with reference to FIGS. 1 and 4, the front panel 12 has a top edge defined by a fold line 24 and a bottom edge defined by a fold line 26. The fold line 24 interconnects the front panel 12 with a pair of bottom shelf flaps 28 and 30 which are separated by a divider slot 32. The fold line 26 interconnects the front panel 12 with a front bottom flap 34 which forms part of the bottom panel assembly 20 described below. The lefthand side edge of front panel 12 is connected by a fold line 36 to the left side panel 16, and the right side edge of front panel 12 is connected by a fold line 38 to the right side panel 18.

The left and right side panels 16, 18 are similar in construction except for the manner in which they are connected to the back panel 14. The left side panel 16 comprises a main side flap 40 which is connected along its right side edge by a fold line 41 to upper and lower shelf support flaps 42 and 44. The left side edge of main side flap 40 is connected by a fold line 45 to a glue flap 46. Additionally, the left side panel 16 includes a locking flap 48 connected along an angled top edge of the main side flap 40 by a fold line 50. Preferably, the upper and lower shelf support flaps 42, 44 are separated by a slot 56 and the locking flap 48 and upper shelf support flap 42 are separated by a slot 57, for purposes to become apparent below.

The base of left side panel 16 carries a left bottom flap 58 which is connected to the main side flap 40 thereof along a fold line 60. The right hand edge of left bottom flap 58, in turn, is detachably connected by a scored or perforated line 62 to the leftside edge of the front bottom flap 34 associated with front panel 12. This perforated line 62 permits the front bottom flap 34 and left bottom flap 58 to be separated from one another in advance of the operation to assembly display 10, as described in detail below.

As noted above, the right side panel 18 is similar in construction to the left side panel 16 with the exception of the manner of connection to back panel 18. The right side panel 18 comprises a main side flap 64 which is connected by a fold line 66 to upper and lower shelf support flaps 68 and 70, and by a fold line 72 to the back panel 14. The angled top edge of main side flap 64 is connected by a fold line 74 to a locking flap 76, while the base of main side flap 64 is connected by a fold line 78 to a right bottom flap 80. The right bottom flap 80, in turn, is connected by a scored or perforated line 82 to the righthand edge of front bottom flap 34 to permit separation thereof in advance of the assembly operation. As depicted at the center of FIG. 4, the upper and lower shelf support flaps 68 and 70 are separated by a gap or slot 84 corresponding to the slot 56 between upper and lower shelf support flaps 42, 44 and a space or gap 85 is formed between the locking flap 76 and upper shelf support flap 68 which corresponds to gap 57.

The upper shelf support flaps 42 and 68 are interconnected by a scored or perforated line 86, and the lower shelf support flaps 44, 70 are separated by a scored or perforated line 88. As described in more detail below in connection with a discussion of assembly of display 10, the upper and lower shelf support flaps 42, 44 are separated from the upper and lower shelf support flaps 68, 70, respectively, at the beginning of a display assembly operation, and then all flaps 42, 44, 68 and 70 are folded toward their respective main side flaps 40 or 64 to provide support for the shelf assembly 22. The locking flaps 48 and 76 are also foldable in the same direction, i.e. toward their respective main side flaps 40, 64, to provide additional support for the shelf assembly 22.

With reference to FIG. 2A and the righthand portion of FIG. 4, the top end of back panel 14 includes a handle portion 94 formed with a handle opening 96 and a pair of locator recesses 98, 100 positioned on either side of the handle portion 94.

Figure 3:
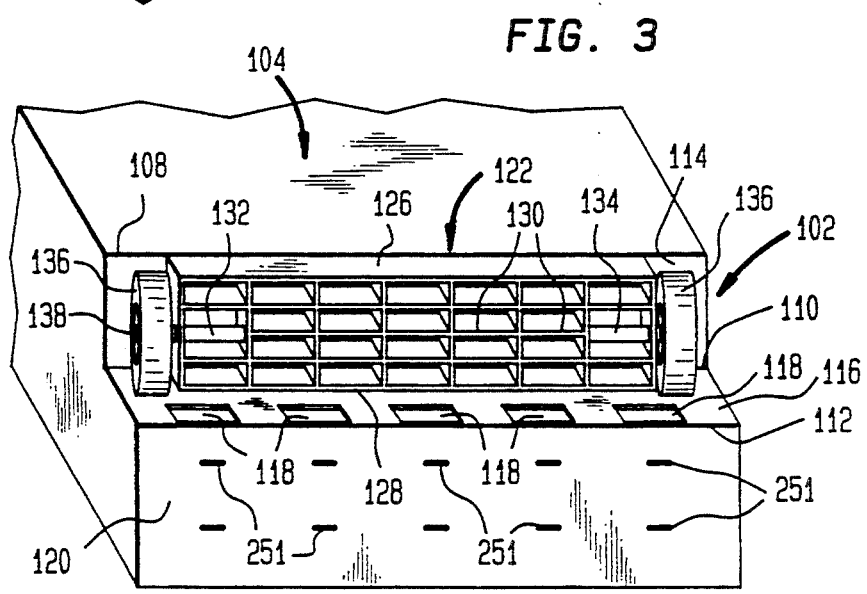
FIG. 3 is a perspective view of a portion of the bottom of the display illustrating the wheel assembly and seat.

The bottom portion of back panel 14 includes structure which forms a seat 102 for a wheel assembly 104, described in more detail below. With reference to FIGS. 3 and 4, the seat 102 is formed in a back bottom flap 106 which is connected by a first fold line 108 to the back panel 14. The back bottom flap 106 is also formed with a second fold line 110 and a third fold line 112 such that the second fold line 110 is located approximately equidistant between the first and third fold lines 108, 112. In order to form the seat 110, the back bottom flap 106 is initially folded perpendicularly to the back panel 14 along the first fold line 108 so that the entire back bottom flap 104 extends generally horizontally. The back bottom flap 106 is then folded vertically downwardly along the second fold line 110, thus forming a horizontal section 114 between the first and second fold lines 108, 110. The seat 102 is completed by folding the back bottom flap 106 in a generally horizontal direction along the third fold line 112 to form a vertical section 116 extending between the second and third fold lines 110, 112. As seen in FIG. 3, the seat 102 therefore consists of the horizontal section 114 and vertical section 116 of back bottom flap 106 folded in the general shape of an inverted L which extends along the entire width of the back panel 14 of display 10. Preferably, the vertical section 116 of seat 102 is formed with a number of spaced openings 118 for purposes to become apparent below. The remainder of forward portion 120 of the back bottom flap 106 extends outwardly from the third fold line 112 and seat 102 in a generally horizontal orientation. This forward portion 120 of back bottom flap 106 is connected to the front bottom flap 34, left bottom flap 58 and right bottom flap 80 in a stapling operation described in more detail below.

As noted above, the seat 102 is intended to support the wheel assembly 104 at the base of display 10. In the presently preferred embodiment, the wheel assembly 104 comprises a mounting block or axle 122 formed of a plastic material in an injection molding operation and includes a top (not shown), opposed sides 126, 128 and a number of spaced, reinforcing slats 130 arranged in intersecting columns and rows. These slats 130 are cut away at each end to make room for wheel mounting posts 132 and 134 which are integrally formed or otherwise permanently affixed to the axle 122. Each mounting post 132, 134 supports a wheel 136 which is snapped in position thereon and held in place by a flange 138. Preferably, the top and side 128 of the wheel assembly 104 axle 122 are glued or otherwise permanently affixed to the horizontal and vertical sections 114, 116, respectively, of the seat 102 so that the wheels 136 face downwardly and do not engage the vertical section 116 of seat 102. As shown in FIGS. 1 and 2A, the combined width of the axle 122 and wheels 136 of wheel assembly 104 is less than the overall width of the display 10 between the left and right side panels 16, 18. As a result, the wheel assembly 104 is substantially completely concealed from view while looking at the display 10 from the front. Additionally, because the seat 102 is recessed within the base of display 10, the wheels 136 are at least partially concealed from view by the left and right side panels 16, 18 when looking at the display 10 from either side.

Figure 5:
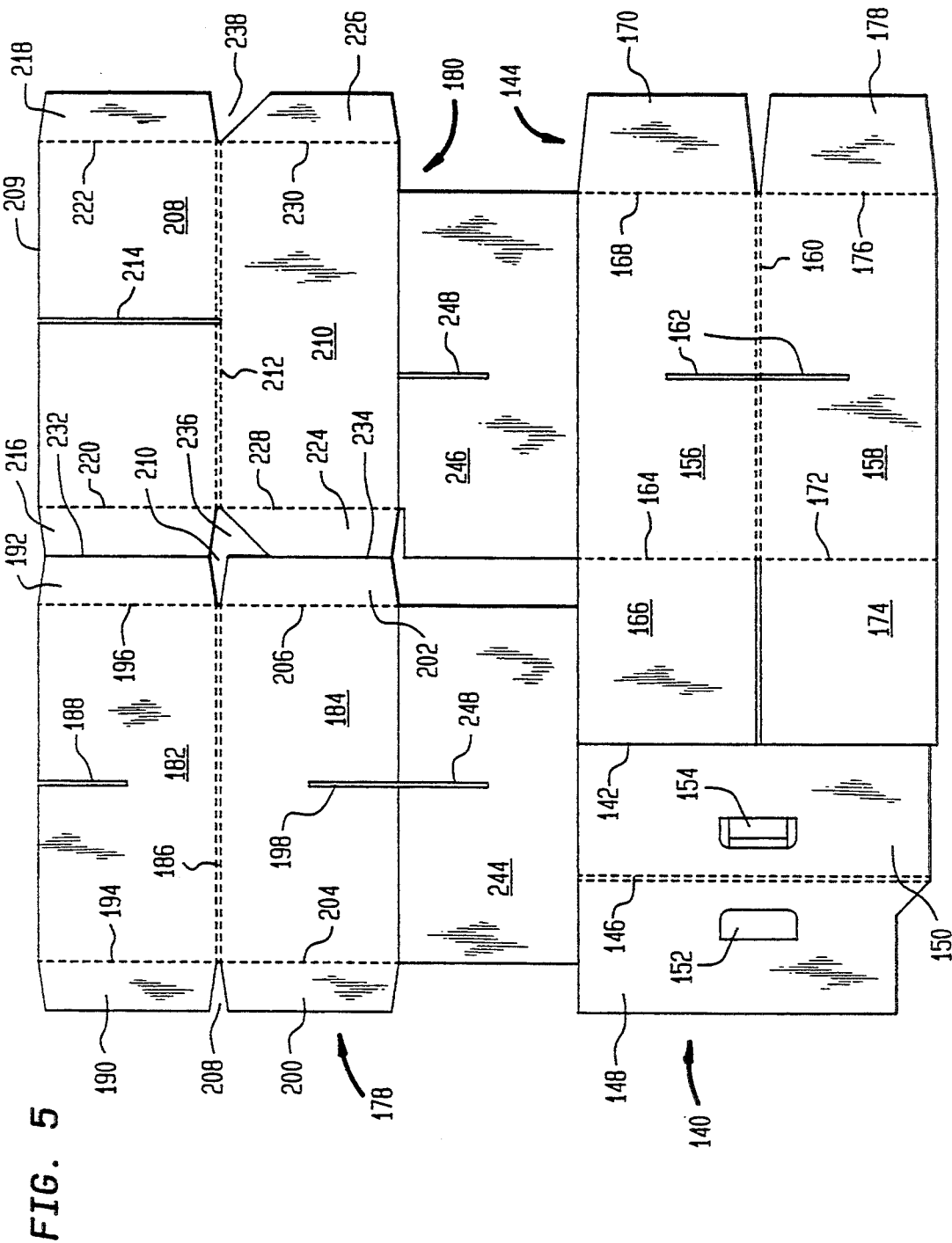
FIG. 5 is a view of the cardboard blank from which the shelves and divider of this invention are folded.

With reference now to FIGS. 2A, 2B and 5, the components of shelf assembly 22 and a handle flap 140 illustrated in more detail. Considering first the bottom portion of FIG. 5, the handle flap 140 is connected by a scored or perforated line 142 to the base of a divider 144 which forms a part of the shelf assembly 22 as described below. The handle flap 140 includes a center fold line 146 defining two halves 148 and 150 each formed with a handle opening 152, 154, respectively. As described in more detail below in connection with a discussion of the assembly of display 10, the handle flap 40 is attachable over the handle portion 94 of back panel 14 to permit movement of the display 10 from place to place in a retail establishment upon its wheel assembly 104.

The divider 144 comprises two divider halves 156 and 158 which are connected along a fold line 160. A slot 162 extends between the divider halves 156, 158 which intersects the fold line 160 and extends generally perpendicular thereto. The divider half 156 is connected at its base by a fold line 164 to a left bottom shelf flap 166, and at its top edge by a fold line 168 to a first mounting flap 170. Similarly, the second divider half 158 is connected by a fold line 172 to a right bottom shelf flap 174, and by a fold line 176 to a second mounting flap 178. As noted above, the left and right bottom shelf flaps 166, 174 are detachably connected by the perforated line 142 to the handle flap 140.

Referring to the top portion of FIG. 5, an intermediate or middle shelf 178 is shown on the lefthand portion thereof, and a top shelf 180 is shown on the righthand portion of such Fig. The middle shelf 178 comprises two shelf halves 182, 184 connected along a central fold line 186. The shelf half 182 is formed with a slot 188 which extends inwardly from a side edge thereof in a direction toward the central fold line 186. A pair of glue flaps 190 and 192 are connected at opposite ends of the shelf half 182 by fold lines 194 and 196, respectively. The shelf half 184 is essentially identical to shelf half 182. Shelf half 184 includes a slot 198 corresponding to slot 188 in shelf half 182, and further includes a pair of glue flaps 200, 202 connected at its opposite ends along fold lines 204 and 206, respectively. The glue flaps 190, 200 are separated by an angled cut out 208 while the glue flaps 192, 202 are separated by a cut out 210. These cut outs 208, 210 permit folding of the shelf halves 182, 184 upon one another during the assembly operation described below.

The top shelf 180 comprises two shelf halves 208 and 210 connected along a central fold line 212. The shelf half 208 is formed with a slot 214 which extends perpendicularly from the side edge 209 thereof to the fold line 212. A pair of glue flaps 216 and 218 are connected by fold lines 220, 222, respectively, to the shelf half 208. The shelf half 210 is formed with a pair of glue flaps 224 and 226 at opposite ends thereof, which are connected along fold lines 228, 230 respectively. The glue flaps 216 and 224 are separated by a cut out 236, and glue flaps 218, 226 are separated by a cut out 238. Additionally, the glue flaps 216 and 228 of top shelf 180 are connected by scored or perforated lines 232 and 234, respectively, to the glue flaps 192 and 202 of the middle shelf 178.

As depicted at the center of FIG. 5, the middle shelf 178 and top shelf 180 are connected along respective scored or perforated lines 240, 242 to panels 244 and 246. The panels 244, 246 in turn, are connected by a scored or perforated line 250 along the handle flap 140 and divider 144. Each of the support panels 244, 246 is formed with a cut out 248.

Assembly of Display

The portable display 10 in this invention is assembled in the following manner. Initially, all of the scored or perforated connections between the various panels and flaps are broken to separate them. Specifically, the upper and lower shelf support flaps 42, 44 associated with left side panel 16 are separate from one another and from the upper and lower shelf support flap 68, 70 of right side panel 18. The front bottom flap 34 associated with front panel 12 is separated from the left and right bottom flaps 58, 80 of left and right side panels 16, 18. Additionally, as depicted in FIG. 5, the middle shelf 178 and top shelf 180 are separated from one another and from the support panels 244, 246. In turn, the handle flap 140 is completely detached from the support panel 244 and divider 144, while the divider 144 is separated from both support panels 244 and 246.

The next step in the assembly operation is to form the front, back and sides of the display 10. Initially, the left and right side panels 16, 18 are folded at a right angle to the front panel 12 along fold lines 36 and 38, respectively. This places the main side flaps 40 and 64 of left and right side panels 16, 18 perpendicular to the front panel 12 and parallel to one another. The back panel 14 is then folded at a right angle to the right side panel 64 along the fold line 72 therebetween so that the side edge 15 of back panel 14 engages the fold line 45 between the glue flap 46 and main side flap 40 of left side panel 16. With the back panel 14 in this position, the glue flap 46 is then folded over the back panel 14 and affixed thereto by adhesive or essentially any other means of permanent attachment. Once connected to the glue flap 46, the back panel 14 is substantially parallel to the front panel 12 and perpendicular to each of the left and right side panels 16, 18.

The next step in the assembly operation is to interconnect the various bottom flaps 34, 58, 80 and 106 in order to form the bottom panel assembly 20 of display 10. Initially, the seat 102 is formed in the back bottom flap 106 of back panel 14 in the manner described above to form horizontal and vertical sections 114, 116 along the fold lines 108, 110 and 112. It is contemplated that the wheel assembly 104 may be affixed to the seat 102 before or after the entire bottom panel assembly 20 is formed, as desired. As noted above, the top and side 126 of wheel assembly 104 are glued or otherwise permanently affixed to the horizontal and vertical sections 114, 116 respectively, so that the wheels 136 of wheel assembly 104 face vertically downwardly upon the completion of the bottom panel assembly 20.

As depicted in FIGS. 2 and 4, the bottom panel assembly 20 is formed by folding the left and right bottom flaps 58, 80 along their respective fold lines 60 and 78 toward one another and generally perpendicular to their respective left and right side panels 16 and 18. The forward portion 120 of back bottom flap 106 is then folded along the third fold line 112 of back bottom flap 106 so that it extends generally perpendicular to the front and back panels 12, 14 and contacts the underside of the folded left and right bottom flaps 58, 80. The front bottom flap 34 is then folded along its fold line 26 toward the back panel 14 so that it rests against and beneath the forward portion 120 of back bottom flap 106. A three layer bottom panel assembly 20 is thus provided wherein the forward portion 120 of back bottom flap 106 is sandwiched between the left and right bottom flaps 58, 80 above, and the front bottom flap 34 below.

In order to interconnect the bottom flaps 34, 58, 80 and 106, the vertical section 116 of seat 102 is formed with a number of spaced openings 118, as noted above. These openings 118 are sized to permit the insertion of half of a stapler gun (not shown) into the interior of display 10 along the surface of the left and right bottom flaps 58, 80. The other half of the stapler is located outside of display 10 along the front bottom flap 34. In this manner, the stapler can be operated to drive staples 251 from the front bottom flap 34 through the forward portion 120 of back bottom flap 106 and through each of the left and right bottom flaps 58, 80 to interconnect all four flaps and thus form the completed bottom panel assembly 20. Without the openings 118, a stapler could not be utilized to form bottom panel assembly 20 and some other means of permanent affixation would be needed such as gluing or the like.

With the bottom panel assembly 20 completely formed, the next step in the assembly operation is to place a partition 252 atop the bottom panel assembly 20 which extends upwardly to the top edge of front panel 12. This partition 252 comprises a standard cardboard rollup or a series of spaced cardboard panels arranged in intersecting columns and rows, both of which are dimensioned to fit within the interior of the display 10 between the left and right side panels 16, 18 and between the front and back panels 12, 14. See FIG. 1. The particular construction of partition 252 is conventional and forms no part of this invention of itself. Once the partition 252 is in place, the display 10 is ready to receive the shelf assembly 22.

With reference to FIGS. 2A and 2B, the shelf assembly 22 includes the divider 144, middle shelf 178 and top shelf 180 which are retained in place on the display 10 by structure associated with the left and right side panels 16, 18. Initially, the halves 156 and 158 of divider 144 are folded together thus forming a combined shelf mounting slot 255 from their slots 162 which receives the middle shelf 178 as described below. The left and right bottom shelf flaps 166 and 174 of divider 144 are folded along their respective fold lines 168, 172 away from one another and perpendicular to the divider halves 156, 158. For the time being, the mounting flaps 170 and 178 of divider 144 are folded toward one another parallel to their respective divider halves 156, 158.

The divider 144 is then placed into the display 10 such that the left and right bottom shelf flaps 166, 174 rest atop the partition 252 and extend to the left and right side panels 16, 18, respectively. The left and right bottom shelf flaps 166, 174 therefore form a bottom shelf 256 atop the partition 252 upon which product can be mounted for display. In the presently preferred embodiment, the bottom shelf flaps 28, 30 associated with front panel 12 can be folded atop the flaps 166, 174 of divider 144 such that the folded divider halves 156, 158 extend within the slot 32 formed between flaps 28, 30. These bottom shelf flaps 28, 30 provide a finished appearance to the front of the display 10 by forming a smooth edge at the top of front panel 12, and, in addition to the shelf flaps 166, 174 associated with divider 144, form the completed bottom shelf 256.

The next steps in the assembly operation are to form the middle shelf 178 and top shelf 180, and then secure them in place to the display 10. Considering first the middle shelf 178, its shelf halves 182, 184 are folded together along central fold line 186 such that their respective slots 188 and 198 align with one another to form a mounting slot 258. The glue flaps 190 and 196 are folded perpendicular to the shelf half 182, and the glue flaps 200, 202 are folded perpendicular to shelf half 184 in a direction away from the glue flaps 190, 196 respectively. The middle shelf 178 is initially positioned within the display 10 by sliding the mounting slot 258 of middle shelf 178 along the mounting slot 255 of divider 144. This interlocks the middle shelf 178 and divider 144, and positions the middle shelf 178 such that its forward edge 260 is flush with the edges of left and right side panels 16, 18 and its rear edge 262 engages the face of back panel 14. Additionally, with the middle shelf 178 mounted to the divider 144, the glue flaps 190 and 196 associated with shelf half 182 extend vertically upwardly along the left and right side panels 16, 18 respectively, whereas the glue flaps 200 and 202 of shelf half 184 extend vertically downwardly along the left and right side panels 16, 18. These glue flaps 190, 196, 200 and 202 would be permanently secured in place in a glueing operation described below.

The top shelf 180 is then positioned within display 10 by initially folding the glue flaps 216, 218 perpendicular to their associated shelf half 208, and by folding glue flaps 224, 226 perpendicular to shelf half 210. The top shelf 180 is then positioned with respect to the divider 144 so that the mounting flaps 170, 178 of divider 144 extend through the slot 214 formed in the shelf half 208 of top shelf 180. As noted above, these mounting flaps 170, 178 are initially allowed to remain in an unfolded position, parallel to the divider halves 156, 158. Once extended through the slot 214 of top shelf half 208, the mounting flaps 170, 178 of divider 144 are folded along their respective fold lines 168, 178 away from one another and toward the left and right side panels 16, 18, respectively. In this position, the mounting flaps 170, 178 of divider 144 extend generally horizontally and lie atop the shelf half 208 of top shelf 180. The other shelf half 210 of top shelf 180 is then folded along the central fold line 212 toward the back panel 14 so that the shelf half 210 overlies the mounting flaps 170, 178 and the other half 208 of top shelf 180. With the shelf halves 208, 210 of top shelf 180 parallel and folded upon one another, the glue flaps 224, 226 of shelf half 210 extend vertically upwardly along the left and right side panels 16, 18, and the glue flaps 216, 218 of shelf half 208 extend vertically downwardly along the left and right side panels 16, 18.

The next step in the assembly operation is to glue or otherwise permanently affix the middle shelf 178 and top shelf 180 in place within the display 10. During the aforementioned operation of positioning divider 144 middle shelf 178 and top shelf 180 in place within the display 10, the upper and lower shelf support flaps 42, 44 associated with left side panel 16 and the upper and lower shelf support flaps 68, 70 associated with right side panel 18 are folded out of the way, i.e. outwardly from the interior of the display 10. See solid lines in FIG. 2A. The same is true of locking flaps 48, 76 associated with left and right side panels 16, 18, respectively. At this time, adhesive is applied to the glue flaps 190, 192, 200 and 202 associated with middle shelf 178, and to the glue flaps 216, 218, 224 and 226 associated with the top shelf 180. With reference to the lefthand side of the display 10, the locking flap 48 of left side panel 16 is then folded inwardly along its fold line 54 and is adhesively connected to the glue flap 226 of top shelf 180. The upper side shelf flap 42 is folded inwardly along its fold line 50 to adhesively engage the glue flap 218 of top shelf 180 and the glue flap 190 of middle shelf 178. In turn, the lower side shelf flap 44 of left side panel 16 is folded inwardly along fold line 50 and into engagement with the glue flap 200 of middle shelf 178. See phantom lines in FIG. 2A. The top shelf 180 is received within the gap or slot 57 formed between the locking flap 48 and upper side shelf flap 42, whereas the middle shelf 178 is received within the slot 56 formed between the upper and lower side shelf flaps 42, 44.

The opposite side of middle and top shelves 178, 180 are secured to the right side panel 18 in a similar fashion. The locking flap 76 of right side panel 18 is folded inwardly along fold line 78 into adhesive engagement with the glue flap 224 of top panel 180. The upper and lower side shelf flaps 68, 80 of right side panel 18 are then also folded inwardly along fold line 66 to adhesively contact the glue flaps 216, 224 of the top shelf 180 and the glue flaps 192, 202 of the middle shelf 178, respectively. In this position, the top shelf 180 is received within the gap 85 between the locking flap 76 and upper shelf support flap 42 of right side panel 18, while the middle shelf 178 is received within the slot 84 between the upper and lower shelf support flaps 68, 70 of right side panel 18.

The foregoing gluing operation therefore securely mounts the middle and top shelves 178, 180, as well as the divider 144, within the display 10. The shelves 178, 180 are not only glued in place but effectively seated within the slots or gaps between adjacent flaps along both the left and right side panels 16, 18. As a result, the display 10 of this invention can support items which are relatively heavy while maintaining its shape and aesthetic appearance for reuse, if desired.

Finally, the handle flap 140 is folded in half along the center fold line 146 and placed atop the handle portion 94 of back panel 14. The locator tabs 98, 100 on back panel 14 ensure that the handle openings 152, 154 of handle flap 140 align with the handle opening 96 in back panel 14. In this position, the halves 148, 150 of handle flap 140 are glued or otherwise permanently affixed to either side of the back panel 14. In this manner, a three layer handle is provided for the display 10 consisting of both halves 148, 150 of handle flap 140 and the handle portion 94 of back panel 14. This enables the display 10 to be readily moved upon its wheel assembly 106 from place to place within the retail establishment, even when filled with product.

Figure 6:
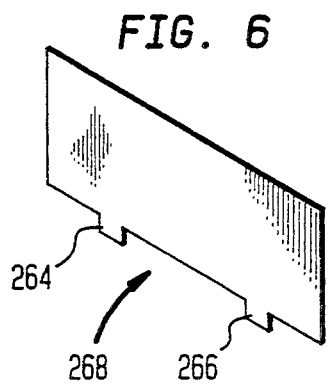
FIG. 6 is a view of a header which mounts to the back panel of the display.

As noted above, the handle flap 140 is formed with slots 145, 147 which are spaced from one another and extend along the center fold line 146. When the handle flap 140 is affixed to the back panel 14, these slots face vertically upwardly in a position to receive the tabs 264 and 266 of a header 268 depicted in FIG. 6. The header 268 extends vertically upwardly from the back panel 14, and is typically provided with printed advertisements and the like to draw attention to the items carried by the display 10.

While the invention has been described with reference to preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

For example, the display 10 of this invention is preferably made substantially entirely of paperboard, such as 200 pound B flute corrugated cardboard. It should be understood, however, that other materials may be utilized to form the display 10, such as engineering plastics, without departing from the scope of the invention.

Additionally, the assembly operation described above contemplated applying adhesive onto the various glue flaps of the shelves 178, 180. Alternatively, the adhesive could be applied to the flaps associated with the left and right side panels 16, 18 as desired.

Therefore, it is intended that the invention not be limited to the particular embodiment disclosed as the best mode contemplated for carrying out this invention, but the invention will include all embodiments falling within the scope of the appended claims.

We claim:

1. A portable display, comprising:
   a front panel, a back panel and a pair of spaced, side panels extending between said front and back panels;
   a bottom panel assembly including four bottom flaps each connected along a fold line to one of said front, back and spaced side panels, said bottom flaps being foldable to a closed position to form a seat;
   at least one shelf for supporting products, said shelf including a front edge, back edge and opposed side edges;
   shelf support means for supporting said at least one shelf, said shelf support means including a divider located between said side panels, and mounting means, associated with each of said side panels, for supporting said opposed side edges of said at least one shelf;
   a wheel assembly including an axle having opposed ends and a pair of wheels each mounted at one end of said axle, said axle and said wheels being mounted to said seat of said bottom panel assembly in a position substantially concealed from view at least when looking toward said front panel.

2. The portable display of claim 1 in which said seat of said bottom panel assembly is formed in said bottom flap connected to said back panel, said seat including a generally horizontal section extending from said back panel toward said front panel and a generally vertical section extending downwardly from said horizontal section, said horizontal section being formed with a number of spaced openings sized to permit the insertion of a stapler device therethrough.

3. The portable display of claim 2 in which said bottom flaps connected to said front and back panels substantially completely overlap one another, and said bottom flaps connected to said side panels each extend about midway along the width of said front and back panels, said openings in said horizontal section of said seat being arranged to permit stapling of each of said four bottom flaps to one another.

4. The portable display of claim 1 in which said at least one shelf is formed with a slot extending from said back edge toward said front edge thereof, said at least one shelf being releasably connected to said divider by inserting said divider into said slot of said at least one shelf.

5. The portable display of claim 1 in which said mounting means of said shelf support means including a pair of vertically extending upper and lower side support flaps associated with each of said side panels, each pair of said upper and lower side flaps being vertically separated from one another forming a slot within which one side edge of said at least one shelf is insertable.

6. The portable display of claim 5 in which said at least one shelf is formed with a pair of glue flaps at each side edge thereof, one of said glue flaps of each side edge being adhesively connected to an upper side support flap and the other of such glue flaps of each side edge being adhesively connected to a lower side support flap.

7. A portable display, comprising,
   a front panel, a back panel and a pair of spaced, Side panels extending between said front and back panels;
   a bottom panel assembly including four bottom flaps each connected along a fold line to one of said front, back and spaced side panels, said bottom flaps being foldable to a closed position to form a seat;
   product support means, located atop said bottom panel assembly, for supporting product;
   a top shelf, a bottom shelf located atop said product support means, and, an intermediate shelf located between said top and bottom shelves, said top and intermediate shelves each having opposed side edges;
   shelf support means for supporting said top shelf and said intermediate shelf, said shelf support means including a divider located between said side panels and extending from said product support means to said top shelf, and mounting means, associated with each of said side panels, for supporting opposed side edges of said top shelf and said intermediate shelf;
   a wheel assembly including an axle having opposed ends and a pair of wheels each mounted at one end of said axle, said axle and said wheels being mounted to said seat of said bottom panel assembly in a position substantially concealed from view at least when looking toward said front panel.

8. The portable display of claim 7 in which said divider includes:
a pair of center flaps connected along a fold line;
first and second bottom shelf flaps each connected along a fold line to one of said center flaps;
said center flaps being folded toward one another along said fold line to form a vertical section extending between said top shelf and said product support means, said first and second bottom shelf flaps each being foldable substantially perpendicularly to said vertical section in a position to overlie said product support means.

9. The portable display of claim 8 in which said top shelf is formed with an upper half section and a lower half section foldable together along a central fold line, said lower half section being formed with a slot, said divider further including a pair of top flaps each connected to one of said center flaps, said top flaps being insertable through said slot of said lower half section of said top shelf and then being foldable substantially perpendicularly to said vertical section of said divider so that said top flaps are sandwiched between said upper and lower half sections of said top shelf.

10. The portable display of claim 7 in which said seat of said bottom panel assembly is formed in said bottom flap connected to said back panel, said seat including a generally horizontal section extending from said back panel toward said front panel and a generally vertical section extending downwardly from said horizontal section, said horizontal section being formed with a number of spaced openings sized to permit the insertion of a stapler device therethrough.

11. The portable display of claim 10 in which said bottom flaps connected to said front and back panels substantially completely overlap one another, and said bottom flaps connected to said side panels each extend about midway along the width of said front and back panels, said openings in said horizontal section of said seat being arranged to permit stapling of each of said four bottom flaps to one another.

12. The portable display of claim 7 in which said at least one shelf is formed with a slot extending from said back edge toward said front edge thereof, said at least one shelf being releasably connected to said divider by inserting said divider into said slot of said at least one shelf.

13. The portable display of claim 7 in which said mounting means of said shelf support means includes:
a pair of locking flaps each connected along a fold line to one of said side panels;
an upper side support flap and a lower side support flap connected along fold lines to each of said side panels, said upper and lower side support flaps associated with each side panel being vertically spaced from one another to form a first slot therebetween, and each of said upper side support flaps being vertically spaced from one of said locking flaps connected to a respective side panel to form a second slot therebetween;
said side edges of said intermediate shelf being insertable within said first slot formed between said upper and lower side support flaps of each of said side panels, and said side edges of said top shelf being insertable within said second slot formed between each of said upper side support flaps and said locking flaps.

14. The portable display of claim 13 in which said intermediate shelf is formed with a pair of glue flaps at each side edge thereof, one of said glue flap of each side edge being adhesively connected to an upper side support flap and the other of such glue flaps of each side edge being adhesively connected to a lower side support flap.

15. The portable display of claim 13 in which said top shelf is formed with a pair of glue flaps at each side edge thereof, one of said glue flaps of each side edge being adhesively connected to a locking flap and the other of said glue flaps of each side edge being adhesively connected to an upper side support flap.

* * * * *